United States Patent [19]

Holub

[11] Patent Number: 5,548,946
[45] Date of Patent: Aug. 27, 1996

[54] FLOWPACKER AND TOOL ASSEMBLY THEREFOR

[75] Inventor: Manfred Holub, Rijnsburg, Netherlands

[73] Assignee: Klockner Hansel Tevopharm B.V., Schiedam, Netherlands

[21] Appl. No.: 414,295

[22] Filed: Mar. 31, 1995

[30] Foreign Application Priority Data

Apr. 7, 1994 [NL] Netherlands .......................... 9400550

[51] Int. Cl.⁶ .............................. B65B 51/30; B65B 9/06; B65B 9/20; B65B 51/16
[52] U.S. Cl. ............................. 53/550; 53/201; 53/374.4; 156/582; 156/583.1
[58] Field of Search ......................... 53/201, 550, 374.4, 53/553; 156/582, 583.1

[56] References Cited

U.S. PATENT DOCUMENTS

| | | | |
|---|---|---|---|
| 3,086,577 | 4/1963 | Gimple | 156/582 X |
| 3,188,259 | 6/1965 | Leger | 156/582 X |
| 3,439,471 | 4/1969 | Kraft | 53/550 X |
| 3,605,194 | 9/1971 | Nauta | 156/582 X |
| 3,616,095 | 10/1971 | Membrino | 156/582 |
| 3,638,522 | 2/1972 | Bolli | 53/550 X |
| 3,850,780 | 11/1974 | Crawford et al. | 53/550 X |
| 3,943,686 | 3/1976 | Crawford et al. | 53/550 X |
| 4,574,566 | 3/1986 | Eaves et al. | |
| 4,807,426 | 2/1989 | Smith | 53/550 |
| 4,949,846 | 8/1990 | Lakey | 53/550 X |
| 5,094,657 | 3/1992 | Dworak et al. | 53/374.4 X |

FOREIGN PATENT DOCUMENTS 828.967 4/1961 France.
1114501 5/1968 United Kingdom.

*Primary Examiner*—Horace M. Culver
*Attorney, Agent, or Firm*—Young & Thompson

[57] ABSTRACT

Flowpacker with unilaterally supported cross sealing shafts, on which one or more cross seal tools are disposed, distributed over the radial periphery. For rapid resetting and simple maintenance, the cross seal tools are disposed on a casing part, which casing part is pushed onto the cross seal shaft, and is retained thereon. The casing part is, for example, held clamped on all sides on the cross seal shaft.

12 Claims, 5 Drawing Sheets

FLOWPACKER AND TOOL ASSEMBLY THEREFOR

FIELD OF THE INVENTION

The invention relates to a flowpacker, for example of the type known from U.S. Pat. No. 4,574,566. The invention relates in particular to a flowpacker which is relatively easily resettable for packing, for example, repeatedly changing numbers of articles per pack and/or packing repeatedly changing dimensions, in particular the dimension viewed in the lengthwise direction of the conveyor belt.

BACKGROUND OF THE INVENTION

In the case of the known flowpacker the longitudinal edges of an initially flat film strip are brought together to form a tube around the articles moving in a stream with the film strip along a horizontal conveyor belt. The tube is closed in the lengthwise direction by joining together the longitudinal edges which have been brought together, thus forming a longitudinal fin. The tube is then pinched at regular intervals in transverse regions by means of so-called cross seal tools, and is sealed and cut through there in the transverse direction. Individual pouch-type packs are thus obtained from an initially flat film strip, each pouch being provided with a longitudinal seam and at each end a transverse seam, and the pouch containing one or more articles.

The cross seal tools are usually situated on two parallel cross seal shafts rotating in opposite directions, which shafts are disposed at a distance from each other on either side of the conveyor belt, and which run at right angles to the lengthwise direction of the conveyor belt. The cross seal tools project radially from the outer periphery of the rotating cross seal shafts. They are aligned in such a way that in each case two cross seal tools on either side of the conveyor belt touch each other so that they just overlap, and hold the film of the tube clamped between them. The speed of rotation of the cross seal shafts is usually synchronized with the speed of forward movement of the tube. If desired, the tube may be moved along intermittently through the pulling action of the rotating cross seal tools. Depending on the length of the pack to be made, which is determined by the distance between the transverse seams, and the diameter of the wrapper, which is determined by the contact faces of the cross seal tools, one or more cross seal tools are situated on a cross seal shaft, which tools are distributed at equal angular intervals over the radial periphery of the cross seal shaft. If the flowpacker needs to be reset, the number of cross seal tools per cross seal shaft and/or the distance between the contact face of the cross seal tools and the rotary shaft will also have to be adjusted, in order to adjust the distance between two successive transverse seams in the tube.

The cross seal tools have to meet high standards. They are designed to press the walls of the tube, which are made of relatively thin film, reliably against each other over the full width of the tube. At the same time, they have to ensure that the film parts which have been pressed against each other are bonded together. For this purpose, one or both cross seal tools are often heated, in order to heat-weld the film. Film which fuses together through sufficient pressure force is also sometimes used. Heating of the cross seal tools is not necessary in that case. It will be clear that in both cases only an extremely slight variation is permissible in the pressure force produced by the cross seal tools over the width of the transverse seam. The cross seal tools are also generally provided with cutters, in order to cut through the tube in the transverse seam regions. The operation of the cutters must be sufficiently reliable over the full width of the transverse seam region. If the welding and/or cutting off is not sufficiently reliable, this will lead to considerable production problems, which are inadmissible, in view of the high production speeds - several hundred packs per minute. It will be clear that this means high standards being set for the adjustment of the cross seal tools, the rotary shafts on which they are situated, and the support and drive of said shafts. It is for those reasons that the rotary shafts are mainly bilaterally supported.

It is already known to support and drive the cross seal tools unilaterally, which means that the accessibility of the conveyor belt in the area around the cross seal tools is increased compared with bilaterally supported cross seal shafts. This means that, for example, adjustment operations on the cross seal tools fixed on the cross seal shafts are simpler, and cleaning and maintenance of the flowpacker is simpler and easier to carry out.

However, given the required accuracy of the operation of the cross seal tools mentioned above, the use of unilaterally supported rotary shafts for the cross seal tools requires special design measures. In particular, account has to be taken of sagging of the rotary cross seal shafts from the support towards the free, unsupported axial end. As a result of this, removal of the cross seal shaft for resetting the flowpacker by adjusting the cross seal tools is virtually impossible.

Therefore, as far as unilaterally supported cross seal shafts are concerned, it is common practice to fit the cross seal tools on the cross seal shaft in such a way that they can be removed separately. In this case it is usual only to connect each cross seal tool to the cross seal shaft by means of one or more bolts projecting radially into the cross seal shaft. In the holes pattern in the cross seal shaft account is taken of the possibility of fitting various numbers of cross seal tools distributed at equal angular intervals. It is thus possible in turn to fit, for example, one, two or four or, for example, one, three or six cross seal tools on one cross seal shaft. In the holes pattern account can even be taken of the possibility of alternately using three or four cross seal tools. It will be clear that a complicated holes pattern in the cross seal shaft is necessary for such a possibility. Consequently, problems arise, such as space problems for the bolt shanks projecting into the cross seal shafts, the bolts connecting the cross seal tools to the cross seal shafts are difficult to reach for fitting and removal, and special equipment is consequently required, and the extensive holes pattern considerably weakens the cross seal shaft and consequently makes it more flexible, with the result that the sagging of the cross seal shaft increases, which has an adverse effect on reliable operation of the cross seal tools over the total transverse length of the tube. In practice, account is therefore taken mainly of the possibility of doubling or halving the number of cross seal tools on a cross seal shaft. For a different setting, such as the changeover from three to four tools, replacement of a complete cross seal shaft is necessary, with all the adjustment problems which this entails.

The known system for changing the cross seal tools on unilaterally supported cross seal shafts therefore still has disadvantages. For example, the necessary resetting operations are still major operations, since in each case the cross seal tools have to be fitted and removed and adjusted to the cross seal shaft one by one, which involves a considerable idle period for the flowpacker. On the other hand, the required holes pattern causes an unavoidable reduction in the bending rigidity of the cross seal shaft, which reduces the functioning reliability. Despite those disadvantages, the known system has already been in use for quite a long time.

Recapitulating, for quite a long time there has been a desire for a more practical system of changing the cross seal tools on the unilaterally supported cross seal shafts of a flowpacker, for purposes of resetting operations, but also for maintenance work, bearing in mind the requirements for accurate working of the cross seal tools.

SUMMARY OF THE INVENTION

The object of the invention is to fulfil the above-mentioned desire. To this end the invention provides a packing device of the flowpacker type, as indicated more particularly in the appended claims.

With the invention it is now possible to reset the flowpacker more quickly by exchanging the casing part, which can be fitted by means of relatively simple operations on the cross seal shaft. By exchanging the casing part, all cross seal tools are also exchanged simultaneously in one operation. Adjustments can now be made to the cross seal tools on the separate casing part, thus without the tools being installed in the flowpacker, which considerably reduces the required resetting time. Casing parts with different numbers of cross seal tools are simple to keep in stock as spare parts. The casing parts and the cross seal tools can be separate parts, and can be assembled as desired, which assembly work can also be carried out independently of the operation of the flowpacker.

Flowpackers have been provided with unilaterally supported spindles for a long time now, on which spindles stock reels with film strips are inserted, which reels are held clamped on the spindles on all sides on the radial periphery. For such radial clamping the spindles are provided with radially spring-loaded parts on the radial outer periphery. In the case of such spindles with stock reels there is no problem with the high load and the particularly great accuracy and reliability with which the cross seal tools have to function. The combination of such spindles and stock reels is unsuitable for use in the case of cross seal tools.

Flowpackers of the type with bilaterally supported cross seal shaft are also known. They have inserted on the cross seal shaft a separate tool cage with eight integral cross seal tools on the radial outer peripheral surface. Easy replacement/resetting of the cross seal tools is not the object of this system, since the bilateral support of the cross seal shaft is not suitable for this purpose. The push-on tool cage with integral cross seal tools is selected more on account of the particularly large number of cross seal tools. Besides, the particularly high standards set for the cross seal tools on a unilaterally supported cross seal shaft do not apply here. The person skilled in the art therefore does not find in this known type any hint of how to achieve the object of the present invention.

BRIEF DESCRIPTION OF THE DRAWINGS

Further advantages and details will emerge from the appended sub-claims and from the description below of non-limiting exemplary embodiments with reference to the appended drawing, in which:

DETAILED DESCRIPTION OF THE INVENTION

Figure 1:
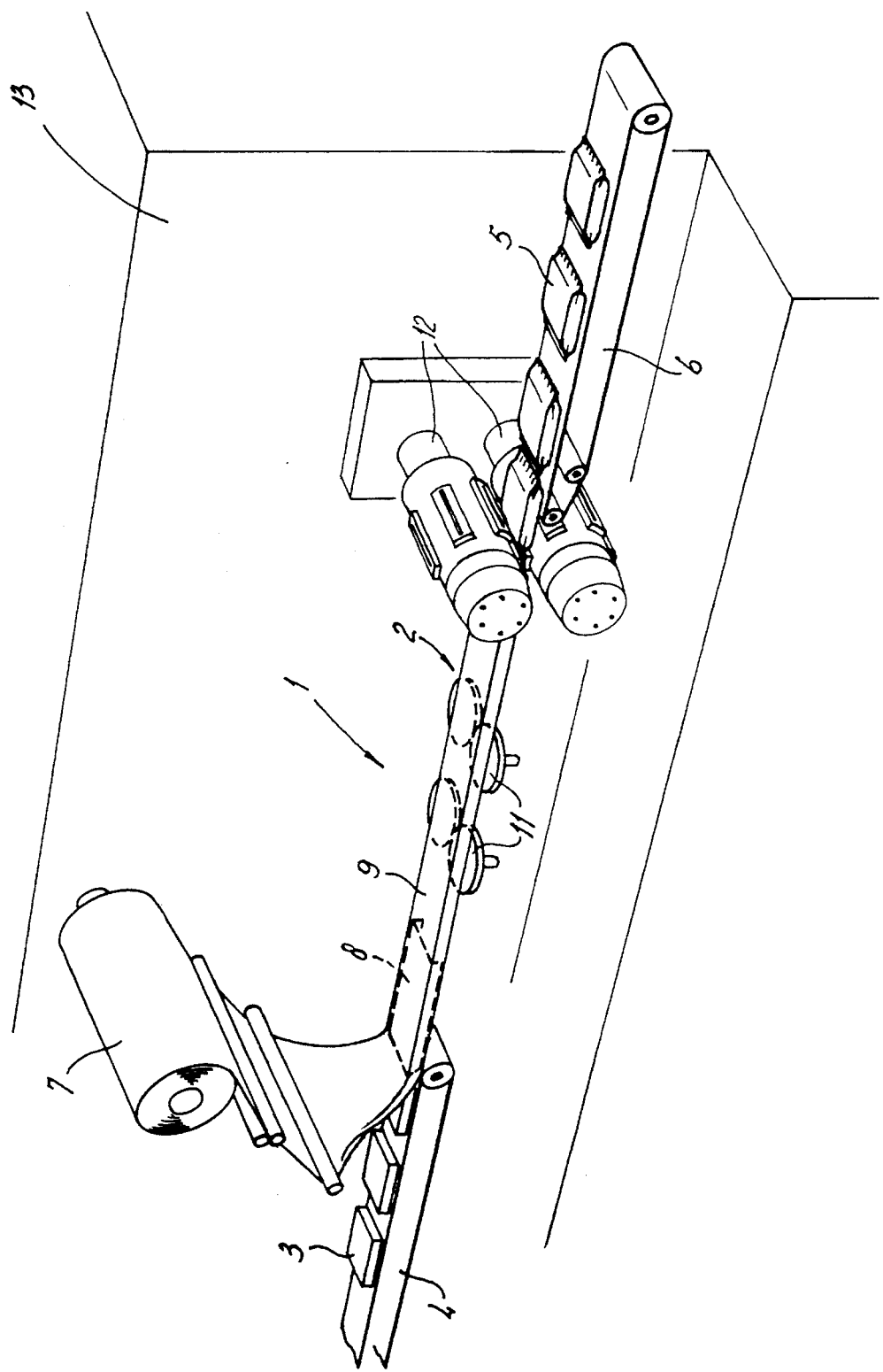
FIG. 1 shows diagrammatically in perspective a general view of a flowpacker.

FIG. 1 shows a flowpacker 1, which is capable of processing 400–800 packs per minute. It has a conveyor belt 2, along which a stream of products 3 can be moved. Disposed upstream of the conveyor belt 2 is a supply chain 4, for supplying the products 3 at a uniform pitch to the flowpacker 1. Individual packs 5 leave the flowpacker 1 along a discharge conveyor 6. Initially flat, film-type material is supplied from a stock roll 7, and bent around a folding box 8 to the shape of an elongated tube 9, which surrounds the conveyor belt 2 and the products 3 moving along it. The longitudinal edges of the tube 9 are welded together by means of two sets of longitudinal sealing rollers 11. Disposed downstream of the longitudinal sealing rollers 11 is a set of cross seal shafts 12 with cross seal tools above and below the conveyor belt 2. As shown, the cross seal shafts 12 are unilaterally supported, and at the supported side project from a drive unit (not shown in any further detail) accommodated in a housing 13.

Figure 2:
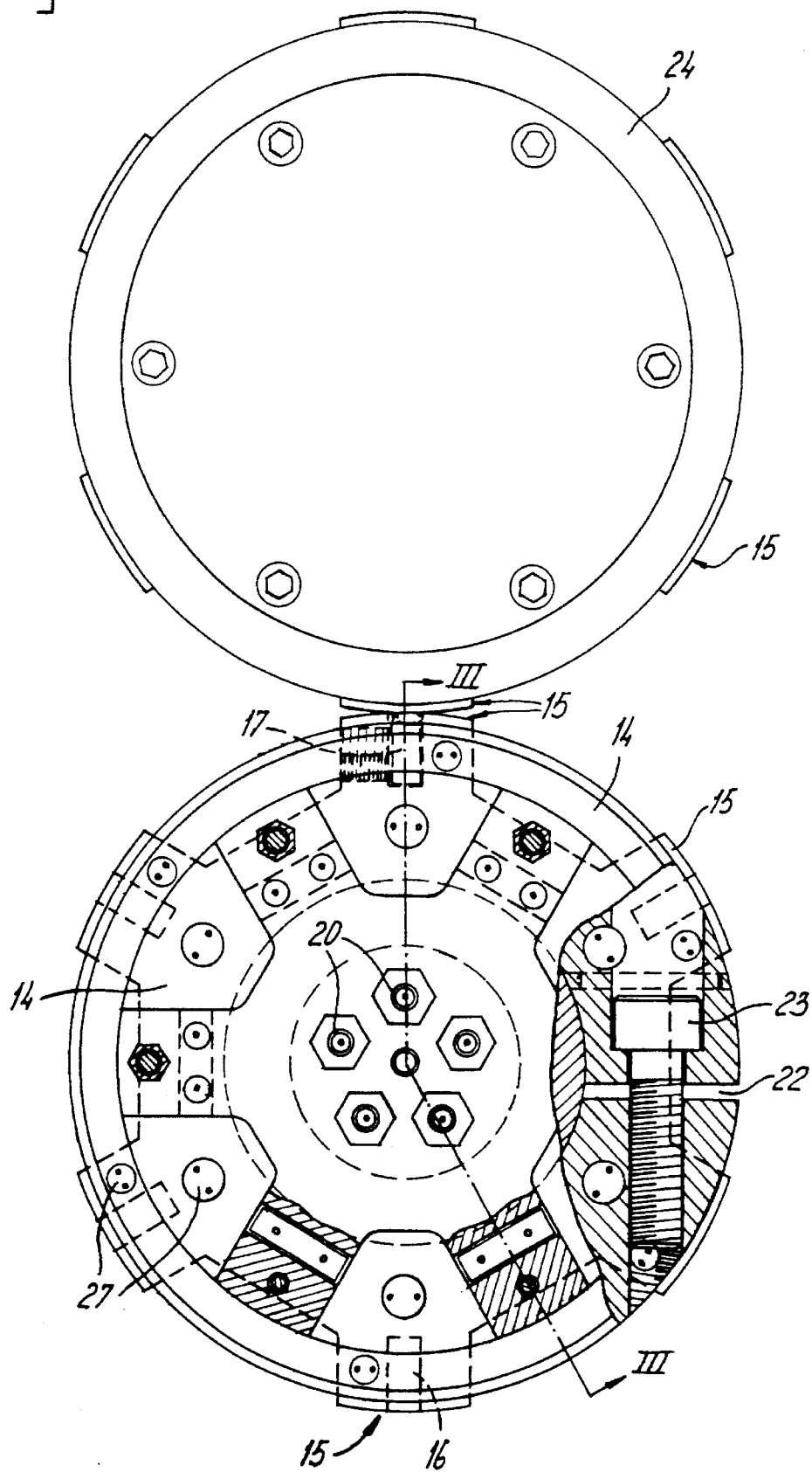
FIG. 2 shows a partially cut-away end view from the unsupported side of the set of cross seal shafts shown in FIG. 1.
Figure 3:
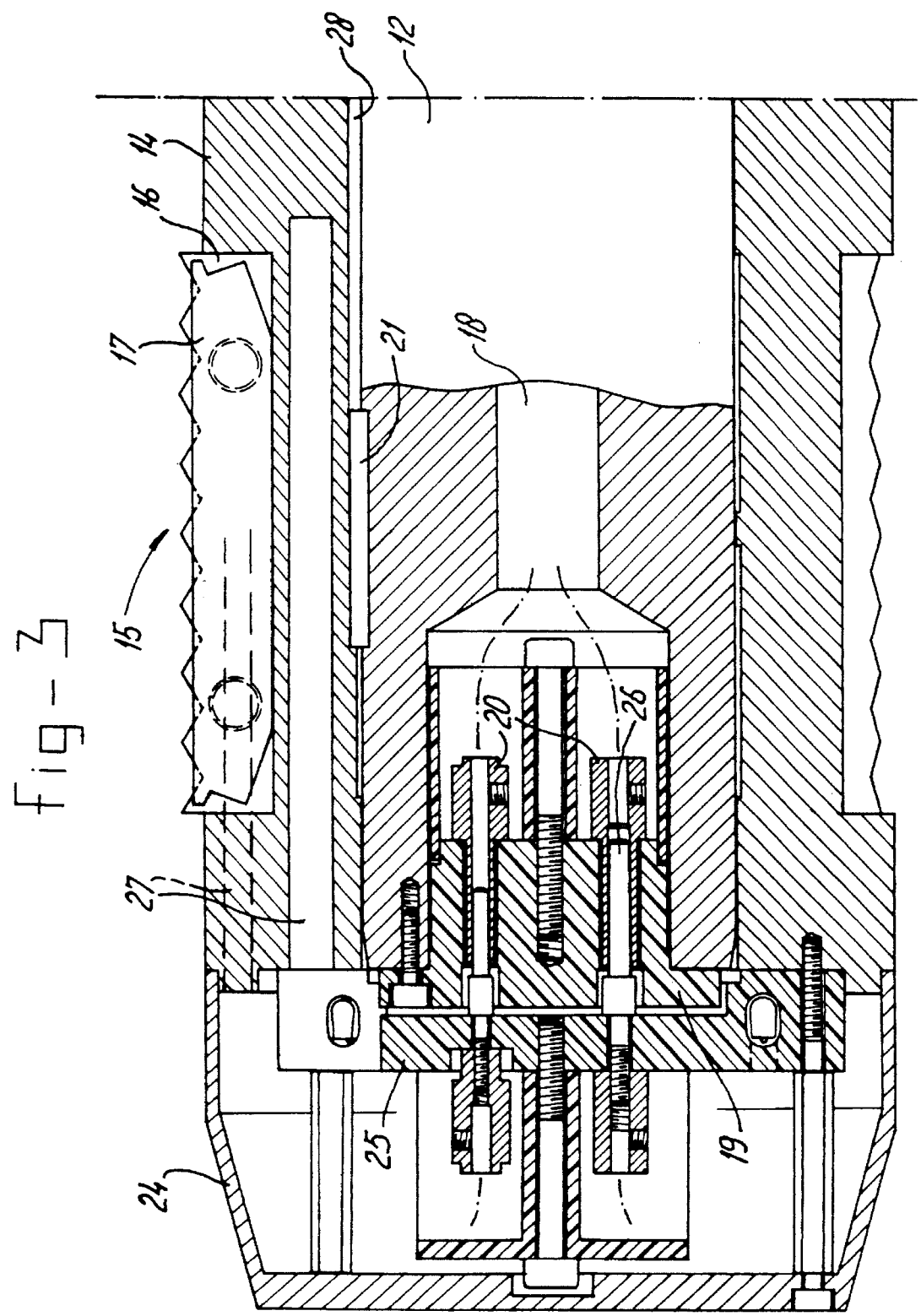
FIG. 3 shows a view in section of the bottom cross seal shaft in FIG. 2, along the line III—III in FIG. 2, according to the invention.
Figure 4:
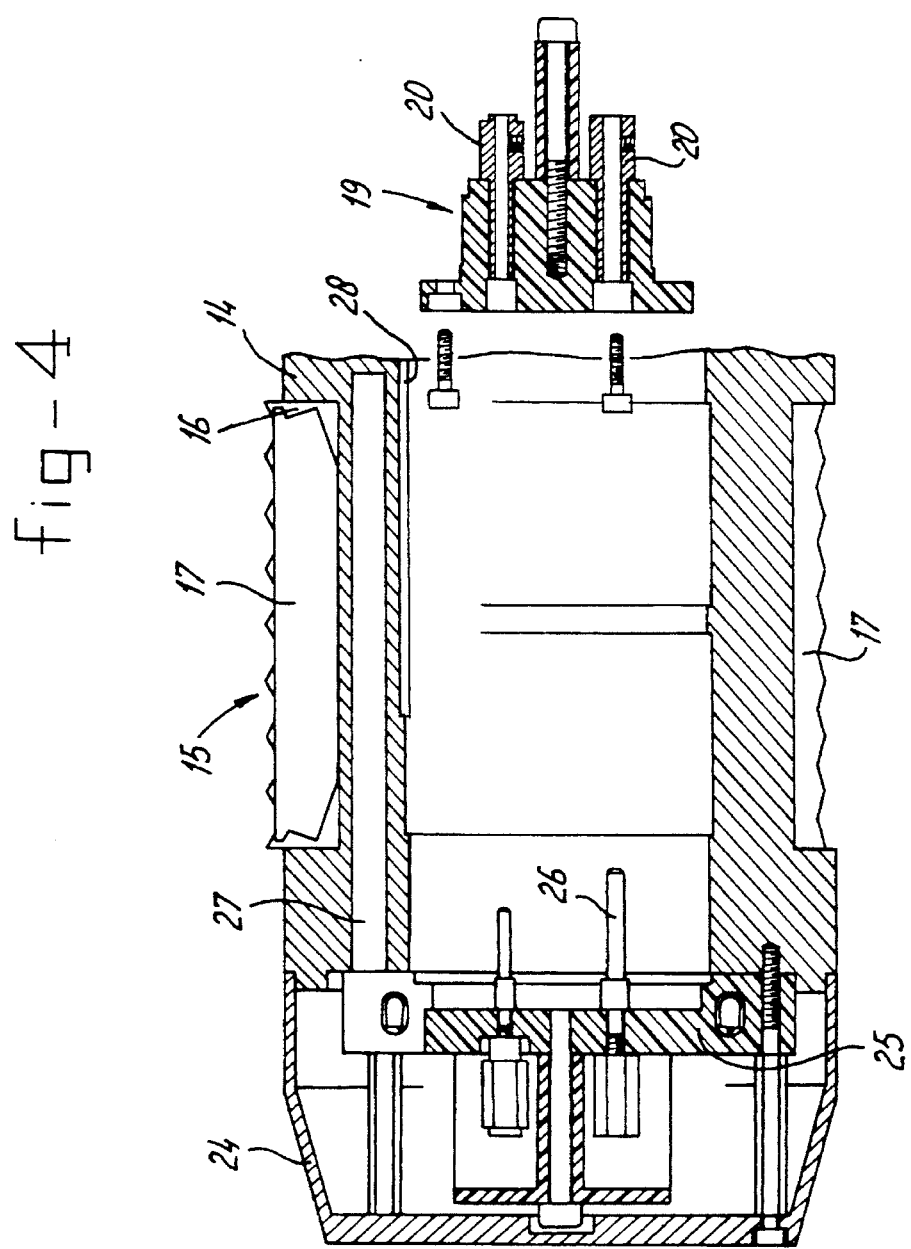
FIG. 4 shows a view corresponding to FIG. 3, with the parts shown fitted at a distance from each other.

FIGS. 2, 3 and 4 show more particularly the design of the cross seal shafts 12 according to a first variant. As will emerge in further detail, the shafts have pushed onto them a casing part 14, having on the radial peripheral surface six cross seal tools 15 distributed at equal angular intervals. In the exemplary embodiment shown the cross seal tools are integral with the casing part 14. As shown most clearly in FIG. 2, each cross seal tool 15 has a central slit 16, for the accommodation of a cutter 17.

FIGS. 3 and 4 show that the shaft 12 is hollow in design. Current-conducting wires, shown only by dotted lines here, run through the hollow 18. These current-conducting wires run from the housing 13 and are connected to a power source (not shown), for example by means of sliding contacts (not visible) fitted on the shaft 12. The hollow 18 is widened at the free end of the shaft 12, for the accommodation of a plug 19. The plug 19 can be connected as a separate part to the shaft 12. The current-conducting wires can be connected electrically to the pins 20 of the plug 19. FIG. 2 shows that six pins 20 are present.

The shaft 12 is also provided with a key 21 on the radial outer peripheral surface, the function of which key will emerge more clearly below.

The casing part 14 has an inner peripheral radius which is slightly smaller or larger than the outer peripheral radius of the shaft 12. The casing part 14 has a longitudinal slit 22 running along its entire length, and running over the full wall thickness and permitting a deformation of the casing part in the radial peripheral direction. Since the casing part is made of a steel alloy, and the slit is sufficiently narrow, the deformations of the casing part will be elastic through widening/narrowing of the slit 22. A bolt 23 is fitted at both axial ends of the casing part (FIG. 2), in each case acting upon either side of the slit 22. For this purpose, the thickened bolt head engages in the casing part 14 at one side of the slit 22, and the threaded part on the shank of the bolt 23 engages in an internally threaded hole in the casing part at the other side of the slit 22. The slit 22 can be widened/narrowed by tightening/loosening the bolt 23. Narrowing the slit 22 means that the casing part 14 can be clamped on the shaft 12 on all sides. Widening the slit 22 means that the casing part is easily pushed onto the shaft 12 and removed from it again. The adjustment of the inner peripheral radius of the casing part to the outer peripheral radius of the shaft 12 permits clamping of the casing part 14 on the shaft 12 on all sides, through using the slit 22 and the elastic deformability of the casing part 14. The use of the casing part 14 requires no special recesses in the radial peripheral surface of the shaft 12, which is advantageous as regards the bending rigidity of the shaft 12, and thus the working accuracy and reliability of the tools 15 on the unilaterally supported shaft 12.

As can be seen more particularly from FIGS. 3 and 4, the casing part 14 is provided with an axial cover 24, for covering the free end face of the shaft 12. The cover 24 houses a connector 25 with mating terminals 26, which project into the hollow surrounded by the casing part 14. The mating terminals 26 are intended for plugging into the pins 20 on the plug part 19, which is inserted in the shaft 12 and is connected thereto. As shown diagrammatically by dotted lines in FIG. 3, electrical conductors run from the mating terminals 26. They run to electrical heating elements and measuring elements (not shown in any further detail), which elements are accommodated in hollows 27 in the tools 15 on the casing part 14. With the connector pins and mating terminals 20, 26, easy resetting is possible for changing casing parts 14 with heated tools 15. For another number of tools 15 the connector 25 is simple to change.

The casing part 14 is also provided on the radial inner peripheral surface with a keyway groove 28 running in the axial direction. When the casing part 14 is pushed onto the shaft 12, the key 21 on the shaft 12 engages in the keyway groove 28 in the casing part 14. The casing part 14 is consequently secured against rotation relative to the shaft 12. The key 21 is positioned as far away as possible from the support of the shaft 12, so that the shaft 12 is weakened as little as possible.

Figure 5:
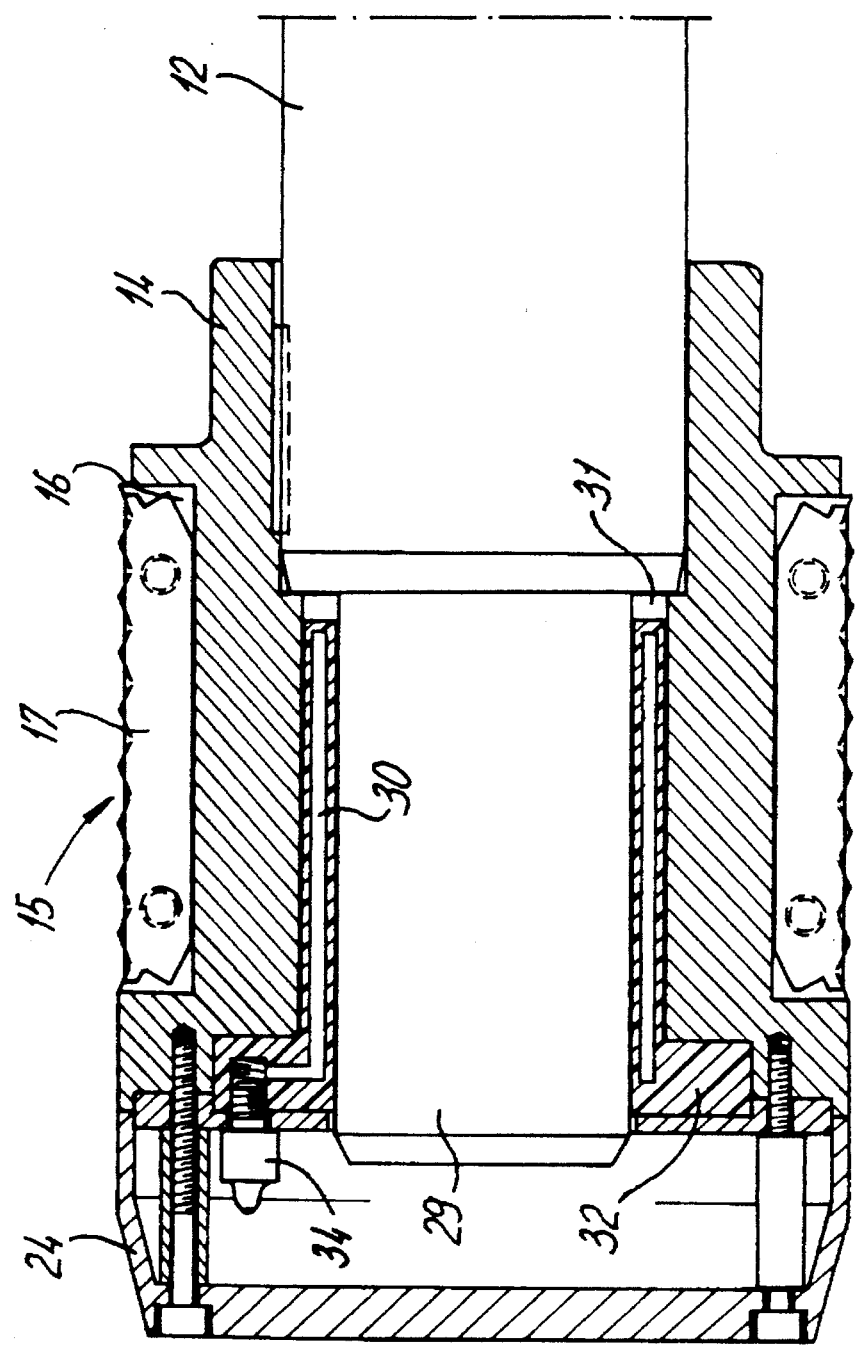
FIG. 5 shows a view corresponding to FIG. 3 of a variant.

FIG. 5 shows a variant for the assembly of unilaterally (cantilever) supported shaft 12 and casing part 14 pushed thereon. The casing part 14 in this embodiment is closed, i.e. the slit 22 from the variant according to FIGS. 2–4 is absent here. This casing part 14 is consequently not easily radially deformable. The radial inner peripheral surface of the casing part is adapted with slight play to the radial outer peripheral surface of the shaft 12, with the exception of an axial end region. The shaft 12 there is tapered 29 at the end facing away from the support 13 (FIG. 1), in order to determine an annular gap 31 between the casing part 14 and the shaft 12. A sleeve 32 is inserted into the gap 31. The sleeve 32 has at one end a flange for resting against the axial end of the casing part 14. The sleeve is hollow, and relatively thin-walled, except in the flange region. A fluid, such as a hydraulic fluid, is present in the hollow 30. A bolt 34 on the flange projects up to the hollow 30. The pressure in the hollow can be adjusted by tightening and loosening the bolt 34. The radial peripheral walls of the sleeve 32 will deform in the radial direction through a pressure increase in the hollow 30. If the sleeve 32 is undeformed, i.e. the pressure in the hollow 33 is sufficiently low, the sleeve 32 is dimensioned in such a way that it is easily placed in the gap 31 and easily removed therefrom again. Once in the gap 31 in the position shown, an increase in pressure in the hollow 30 will cause the sleeve 32 to expand in the radial direction, so that it is clamped between the radial outer surface of the tapered part 29 of the shaft 12 and the radial inner surface of the casing part 14. The casing part 14 is consequently held clamped reliably on all sides on the shaft 12. The shaft 12 is not weakened by holes for fixing the tools 5. The tapered part 29 is situated on the end of the shaft 12 facing away from the support 13, and thereby hardly reduces the axial dimensional stability of the shaft 12. FIG. 5 shows a variant in which the tools 15 are unheated. This variant could also be used for heated tools 15 if desired, for example by taking the measures shown in FIGS. 2–4. The principle of a radially expanding sleeve 32 shown in FIG. 5 could also be used if desired for an embodiment of the type shown in FIGS. 2–4. This means that the longitudinal slit 22 can be omitted. Of course, the principle of the longitudinal slit 22 can also be used in connection with unheated tools 15, for example in the embodiment shown in FIG. 5. The sleeve 32 can then be omitted. A combination of expanding sleeve 32 and longitudinal slit 22 can also be used if desired.

What is important with regard to unilaterally (cantilever) supported cross seal shafts is that provision is made for a casing part on which the cross seal tools can be fixed, and which casing part can be pushed onto the cross seal shaft.

In that connection it is not necessary to make the tools integral with the casing part. The casing part can also be in several sections, for example it can consist of two shell halves. In connection with the resetting outside the flow-packer, it is, however, preferable for the casing part, which is combined beforehand and provided with the tools, to be pushed onto the shaft and only retained thereon.

I claim:

1. Packing device for packing articles supplied successively in a stream, comprising a conveyor belt for moving the articles along in a downstream direction, a supply source for supplying a web of flexible, film-type packing material to the conveyor belt, tube-forming means for forming the packing material into a tube around the conveyor belt, tube sealing elements disposed along the conveyor belt downstream of the tube-forming means, for sealing the tube of packing material in a lengthwise direction of the conveyor belt by joining together longitudinal edges of the film which have been placed against each other, and cross seal elements disposed downstream of said tube-sealing elements, for compressing the tube in transverse regions spaced apart, viewed in the lengthwise direction, the space between said compressed regions accommodating one or more articles from the stream, and said cross seal elements being suitable for connecting to each other walls of the tube which have been compressed against each other in said transverse regions, so as to form a transverse seam in the tube, and being suitable for separating the tube in said transverse regions, so as to obtain individual packs, filled with one or more articles from the stream, said cross seal elements including sealing members disposed opposite each other on either side of the conveyor belt, said sealing members being movable toward and away from each other, so as to allow the tube with the articles therein to pass freely between them, and to compress the tube between them in the transverse regions, at least one of the sealing members comprising a rotary element which projects at right angles to the lengthwise direction of the conveyor belt from a rotary drive unit and overlaps the conveyor belt, said rotary element being encased over at least a part of the length by a casing part, said casing part having on its radial periphery a plurality of substantially rib-shaped projections disposed at essentially equal peripheral intervals, and running essentially parallel to the lengthwise direction of the rotary element, said rib-shaped projections adapted to come into contact with the tube in the transverse regions, and said casing part being detachably fixed to said rotary element.

2. Packing device according to claim 1, further including means for clamping the casing part on all sides on said rotary element.

3. Packing device according to claim 1, wherein the casing part has a longitudinal gap, and at least one element which acts on either side of said gap in order to set the gap width.

4. Packing device according to claim 1, further including means for maintaining a peripheral gap between the casing part and the rotary element, said gap having an annular clamping element held radially compressed between the casing part and the rotary element.

5. Packing device according to claim 4, wherein the annular clamping element is hollow and is filled with a fluid with adjustable pressure, such that at least one of the radial inside and outside wall of the annular clamping element is deformable in the radial direction under the influence of a pressure change in the fluid.

6. Packing device according to claim 5, wherein the rotary element is tapered in a region which is overlapped by the annular clamping element.

7. Packing device according to claim 1, wherein the rib-shaped projections and the casing part are integral.

8. Packing device according to claim 1, wherein the casing part is a one-part sleeve-type element which can be pushed over the device from an end of the rotary element facing away from the rotary drive unit.

9. Packing device according to claim 1, further including one or more conductor elements run from the rotary drive unit through the rotary element, and connected to a power source at a side of the rotary drive unit, said current conductor elements being electrically coupled to first connector elements opening out on the surface of the rotary element.

10. Packing device according to claim 9, wherein each of the rib-shaped projections has an electric heating element, to which a current conductor element having a free end is electrically coupled, a second conductor element being disposed at the free end, and said respective first and second connector elements being detachably connected to each other.

11. Packing device according to claim 1, wherein the rotary element and the casing part form an interacting spline and spline groove unit on the outer and inner peripheral surface respectively.

12. Casing part for use in a packing device for packing articles supplied successively in a stream and including a conveyor belt for moving the articles along in a downstream direction, a supply source for supplying a web of flexible, film-type packing material to the conveyor belt, tube-forming means for forming the packing material into a tube around the conveyor belt, tube sealing elements disposed along the conveyor belt downstream of the tube-forming means, for sealing the tube of packing material in a lengthwise direction of the conveyor belt by joining together longitudinal edges of the film which have been placed against each other, and cross seal elements disposed downstream of said tube-sealing elements, for compressing the tube in transverse regions spaced apart, viewed in the lengthwise direction, the space between said compressed regions accommodating one or more articles from the stream, and said cross seal elements being suitable for connecting to each other walls of the tube which have been compressed against each other in said transverse regions, so as to form a transverse seam in the tube, and being suitable for separating the tube in said transverse regions, so as to obtain individual packs, filled with one or more articles from the stream, said cross seal elements including sealing members disposed opposite each other on either side of the conveyor belt, said sealing members being movable toward and away from each other, so as to allow the tube with the articles therein to pass freely between them, and to compress the tube between them in the transverse regions, at least one of the sealing members comprising a rotary element which projects at right angles to the lengthwise direction of the conveyor belt from a rotary drive unit and overlaps the conveyor belt, said casing part adapted to be pushed onto the rotary element and having on its radial periphery a plurality of substantially rib-shaped projections disposed at essentially equal peripheral intervals, and running essentially parallel to the lengthwise direction of the rotary element, said casing part having a longitudinal gap and at least one element which acts on either side of said gap for setting the gap width.

* * * * *